United States Patent
Zhang et al.

(10) Patent No.: US 9,748,843 B2
(45) Date of Patent: Aug. 29, 2017

(54) DCR INDUCTOR CURRENT-SENSING IN FOUR-SWITCH BUCK-BOOST CONVERTERS

(71) Applicant: Linear Technology Corporation, Milpitas, CA (US)

(72) Inventors: Xu Zhang, Milpitas, CA (US); Jian Li, San Jose, CA (US); Zhouyuan Shi, Fremont, CA (US); Yi Ding Gu, Pleasanton, CA (US)

(73) Assignee: Linear Technology Corporation, Milpitas, CA (US)

( * ) Notice: Subject to any disclaimer, the term of this patent is extended or adjusted under 35 U.S.C. 154(b) by 109 days.

(21) Appl. No.: 14/677,794

(22) Filed: Apr. 2, 2015

(65) Prior Publication Data

US 2016/0087531 A1  Mar. 24, 2016

Related U.S. Application Data

(60) Provisional application No. 62/054,587, filed on Sep. 24, 2014.

(51) Int. Cl.
*G05F 1/24* (2006.01)
*H02M 3/158* (2006.01)
*H02M 1/00* (2006.01)

(52) U.S. Cl.
CPC .. *H02M 3/1582* (2013.01); *H02M 2001/0009* (2013.01)

(58) Field of Classification Search
CPC ....... H02M 3/1582; H02M 2001/0009; H02M 3/156

USPC ......................................... 323/259, 282, 344
See application file for complete search history.

(56) References Cited

U.S. PATENT DOCUMENTS

| | | | |
|---|---|---|---|
| 7,196,499 B1 | 3/2007 | Lipcsei | |
| 7,233,132 B1 * | 6/2007 | Dong | H02M 3/1584 323/272 |
| 8,072,200 B1 * | 12/2011 | Qiu | G01R 19/0092 323/282 |
| 2006/0284606 A1 | 12/2006 | Chen et al. | |

(Continued)

FOREIGN PATENT DOCUMENTS

| | | |
|---|---|---|
| EP | 1689070 A2 | 8/2006 |
| WO | 2012/109680 82 | 8/2012 |

OTHER PUBLICATIONS

Park et al., 10MHz Current Mode 4 Switch Buck Boost Converter (4SBBC) for Polar Modulation, IEEE 2008, pp. 1977-1983.

(Continued)

*Primary Examiner* — Alex Torres-Rivera
(74) *Attorney, Agent, or Firm* — VLP Law Group LLP; Edward Kwok

(57) ABSTRACT

An inductor current-sensing circuit for measuring a current in an inductor includes (a) a first RC network coupled between a first terminal of the inductor and a reference voltage source; and (b) a second RC network coupled between a second terminal of the inductor and the reference voltage source. The first RC network and the second RC network each have a time constant substantially equal to the ratio between the inductance and the DC resistance of the inductor. The inductor which current is being measured may be a primary inductor of a four-switch buck boost converter receiving an input voltage and providing an output voltage.

28 Claims, 5 Drawing Sheets

(56) References Cited

U.S. PATENT DOCUMENTS

| | | | | |
|---|---|---|---|---|
| 2007/0241727 A1* | 10/2007 | Luo | ................... | H02M 3/1588 |
| | | | | 323/272 |
| 2009/0146635 A1* | 6/2009 | Qiu | ..................... | H02M 3/156 |
| | | | | 323/290 |
| 2009/0146643 A1* | 6/2009 | Ostrom | ................ | H02M 3/156 |
| | | | | 324/123 R |
| 2010/0033145 A1* | 2/2010 | Tseng | ................... | H02M 3/156 |
| | | | | 323/282 |
| 2010/0052611 A1 | 3/2010 | Lyle, Jr. | | |
| 2013/0307511 A1* | 11/2013 | De Vries | ............ | H02M 3/1563 |
| | | | | 323/284 |
| 2014/0217996 A1 | 8/2014 | Peker et al. | | |
| 2014/0375288 A1* | 12/2014 | Nora | .................. | H02M 3/1584 |
| | | | | 323/272 |
| 2015/0349634 A1* | 12/2015 | Tschirhart | ............. | G01R 19/32 |
| | | | | 323/271 |
| 2015/0364995 A1* | 12/2015 | Chen | ................... | H02M 3/158 |
| | | | | 323/271 |

OTHER PUBLICATIONS

Extended European Search Report for Application No. 15002058.4, dated Mar. 3, 2016, 7 pages.
Extended European Search Report for Application No. 15002415.6, dated Mar. 3, 2016, 8 pages.

* cited by examiner

DCR INDUCTOR CURRENT-SENSING IN FOUR-SWITCH BUCK-BOOST CONVERTERS

CROSS REFERENCE TO RELATED APPLICATIONS

The present application is related to and claims priority of U.S. provisional patent application ("Copending Provisional Application I"), Ser. No. 62/054,587, entitled "DCR inductor current sensing for 4 switch buck-boost converters," filed on Sep. 24, 2014. The disclosure of the Copending Provisional Application I is hereby incorporated by reference in its entirety.

The present application is also related to U.S. provisional patent application ("Copending Provisional Application II"), Ser. No. 62/088,433, entitled "Peak-Buck Peak-Boost Current-Mode Control for Switched Step-up Step-down Regulators," filed on Dec. 5, 2014. The disclosure of the Copending Provisional Application II is hereby incorporated by reference in its entirety.

BACKGROUND OF THE INVENTION

1. Field of the Invention

The present invention relates to measuring an inductor current in a four-switch buck-boost power converter. In particular, the present invention relates to measuring inductor current using an RC circuit referenced to a virtual ground.

2. Discussion of the Related Art

Four-switch buck-boost power converters are used in many different applications. Such a power converter regulates an output voltage which may be higher than, equal to or lower than the input voltage. A typical four-switch buck-boost power converter has a single inductor and operates synchronously to provide high efficiency over a wide range of load currents. In a power converter, to provide over-current protection, discontinuous-mode operation or current loop regulation, inductor current-sensing is normally required. However, in a four-switch buck-boost power converter, current sensing is made difficult by the high common-mode noise that is often present on both terminals of the inductor.

FIG. 1 shows a first current-sensing technique using sensing resistors in power converter 100. Such a technique is used, for example, in the LM5118 and LM25118 circuits available from Texas Instruments, Inc., Dallas, Tex. As shown in FIG. 1, power converter circuit 100 includes inductor 101, diode 104, sensing resistor 105 and switches 102 and 103. Sensing resistor 105, which is connected in series with diode 104 to one terminal of inductor 101, senses the current in inductor 101 when (and only when) diode 104 is conducting. However, such a configuration cannot sense the peak current in inductor 101.

FIG. 2 shows another inductor current-sensing technique in four-switch power converter 200. Four-switch power converter 200 includes inductor 201, switches 202-205, output capacitor 206 and sensing resistor 207. Sensing resistor 207 senses a valley inductor current in "buck" mode (i.e., when switch 205 is maintained in a constant "on" state) and senses a peak inductor current in "boost" mode (i.e., switch 202 is maintained in a constant "on" state). This current-sensing technique is used in the LTC3780, LTC3789, LT3791, LT8705 circuits available from Linear Technology Corporation, Milpitas, Calif.

The technique of FIGS. 1 and 2 has two drawbacks. First, both sensing resistor 105 of FIG. 1 and sensing resistor 207 of FIG. 2 sense only a portion of their respective inductor currents, as each sensing resistor relies on a switch configuration that allows a current flowing in the respective inductor to flow through the sensing resistor. Second, sensing resistor 105 of FIG. 1 and sensing resistor 207 of FIG. 2 both dissipate power, which may lead to thermal issues in the respective circuits. At the same time, using high-power, precision sensing resistors increases system cost and circuit footprint.

Another current-sensing method, referred to as the "DCR inductor current-sensing scheme" has been widely used in buck or boost converters. FIG. 3 shows one example of the DCR current sensing scheme in a four-switch buck-boost converter 300. As shown in FIG. 3, four-switch buck-boost converter 300 includes switches 305-308, inductor 303 and output capacitor 309. The equivalent DC resistance $R_{DCR}$ of inductor 303 is represented by DCR resistor 304 in FIG. 3. The current in inductor 303 is sensed by providing series-connected sensing resistor 301 and sensing capacitor 302 in parallel to inductor 303 (and equivalent DCR resistor 304). The DCR inductor current-sensing scheme attempts to match the time constant of inductor current $i_L$, given by the ratio of inductance L of inductor 303 to its equivalent DC resistance $R_{DCR}$ (i.e., $L/R_{DCR}$), by the product of resistance $R_s$ of sensing resistor 301 and capacitance $C_s$ of sensing capacitor 302. Under this scheme the sensed voltage $V_{sense}$ across sensing capacitor 302 is proportional to the product of inductor current $i_L$ and DC resistance $R_{DCR}$ (i.e., $V_{sense}=i_L*R_{DCR}$). However, as explained in the article "10 MHz Current Mode 4 Switch Buck Boost Converter (4SBBC) for Polar Modulation," by Park et al., published in the *Proceedings of the 23rd Annual Applied Power Electronics Conference*, pp-1977-83, the rail-to-rain common mode voltage range and the high common mode noise in the sensed voltage, due to switching in the converter output switches, make the current-sensing circuit complicated and very difficult to implement.

SUMMARY

According to one embodiment of the present invention, an inductor current-sensing circuit for measuring a current in an inductor includes (a) a first RC network coupled between a first terminal of the inductor and a reference voltage source; and (b) a second RC network coupled between a second terminal of the inductor and the reference voltage source. The first RC network and the second RC network each have a time constant substantially equal to the ratio between the inductance and the DC resistance of the inductor. The inductor which current is being measured may be a primary inductor of a four-switch buck boost converter receiving an input voltage and providing an output voltage.

In one embodiment, the reference voltage source provides a virtual ground reference, which may be connected to a system ground reference through a decoupling capacitor. The virtual ground reference may refer to the output voltage, the input voltage, and an average between the voltages across the inductor, when the four-switch buck boost converter operates in a buck mode, a boost mode and a buck-boost mode, respectively.

In one embodiment, the inductor current-sensing circuit may further include a third sensing capacitor connected between the first RC network and the second RC network, with the third sensing capacitor having a greater capacitance than each of the effective capacitances of the first and the second RC networks.

According to another embodiment of the present invention, an inductor current-sensing circuit for measuring a current in an inductor includes: (a) a sensing resistor connected in series with the inductor; (b) a first RC network coupled between a first terminal of the sensing resistor and a reference voltage source; and (c) a second RC network coupled between a second terminal of the sensing resistor and the reference voltage source. The first RC network and the second RC network may each have a time constant substantially equal to the ratio between the inductance of the inductor and the DC resistance of the inductor. The first and second RC network may each include (a) a sensing capacitor; (b) a first resistor coupled between a terminal of the sensing resistor and a first terminal of the sensing capacitor; a blocking capacitor coupled at one terminal to one terminal of the inductor; and a second resistor coupled between the first terminal of the sensing capacitor and the other terminal of the blocking capacitor. The ratio in resistance value between the second resistor of the second RC network and the first resistor of the second resistor network less one may be substantially the ratio in resistance value between the sensing resistor and the equivalent DC resistance of the inductor. The blocking capacitor in each of the first and second RC networks may have a capacitance that is greater than the capacitance of the sensing capacitor in the corresponding one of the first and second RC networks.

An inductor current sensed using a method of the present invention may be used to control switching in a four-switch buck boost converter. An example of such control may be found, for example, in the Copending Provisional Patent Application II.

The present invention is better understood upon consideration of the detailed description below in conjunction with the accompanying drawings.

BRIEF DESCRIPTION OF THE DRAWINGS

In these figures, like elements are assigned like reference numerals.

DETAILED DESCRIPTION OF THE PREFERRED EMBODIMENTS

Figure 1:
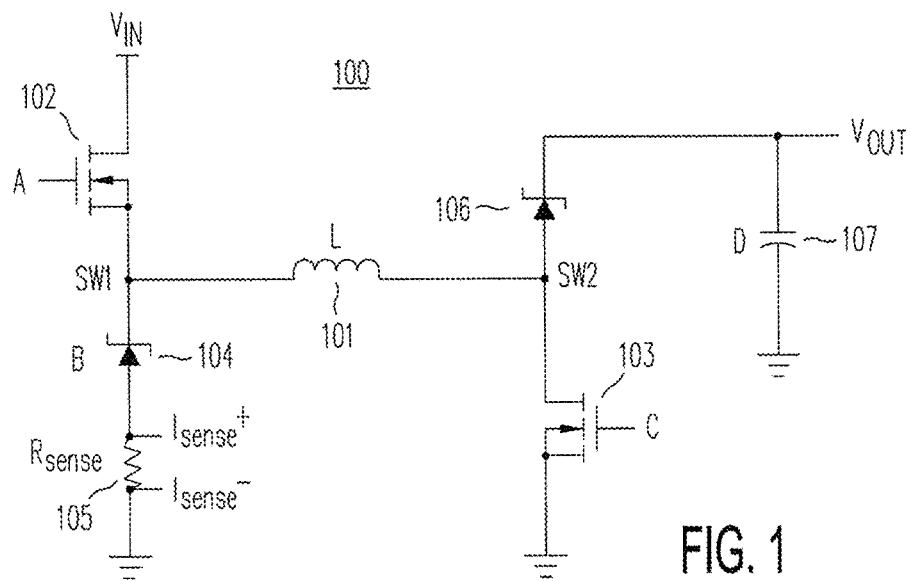
FIG. 1 shows a first current-sensing technique using sensing resistors in power converter 100.
Figure 2:
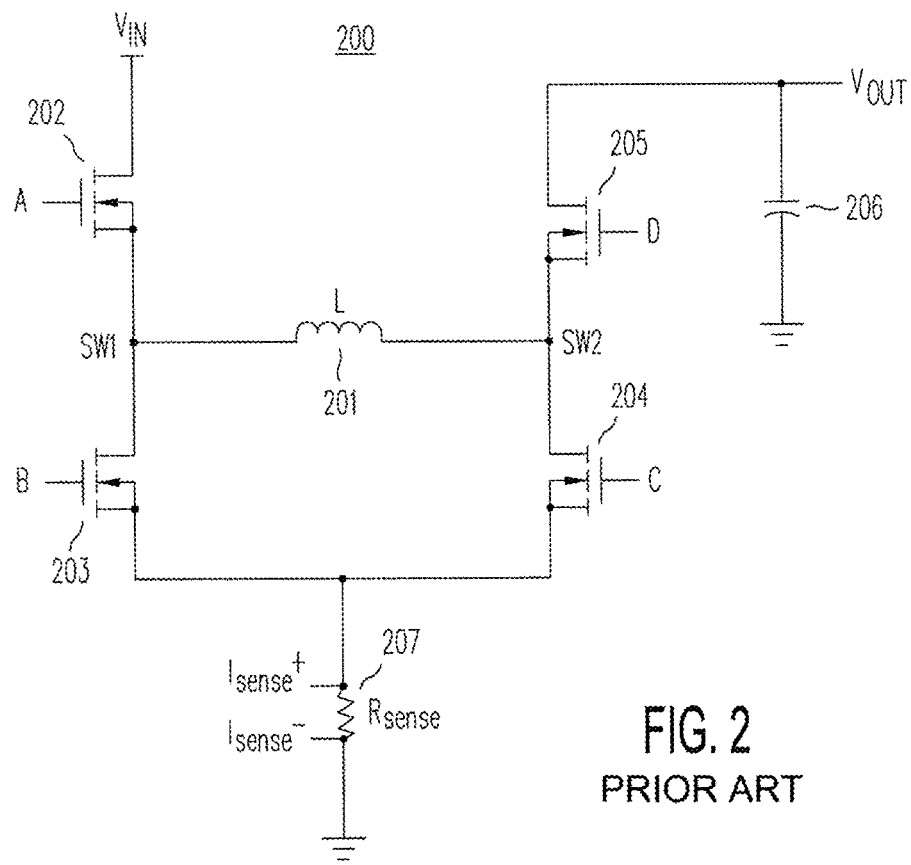
FIG. 2 shows another inductor current-sensing technique in four-switch power converter 200.
Figure 3:
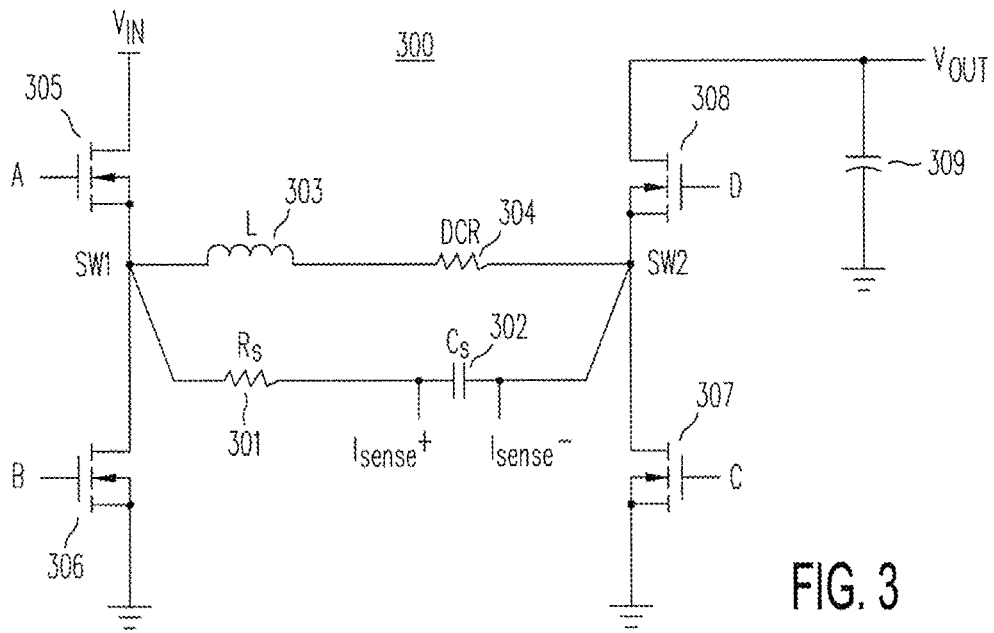
FIG. 3 shows one example of the DCR current sensing scheme in a four-switch buck-boost converter 300.
Figure 4:
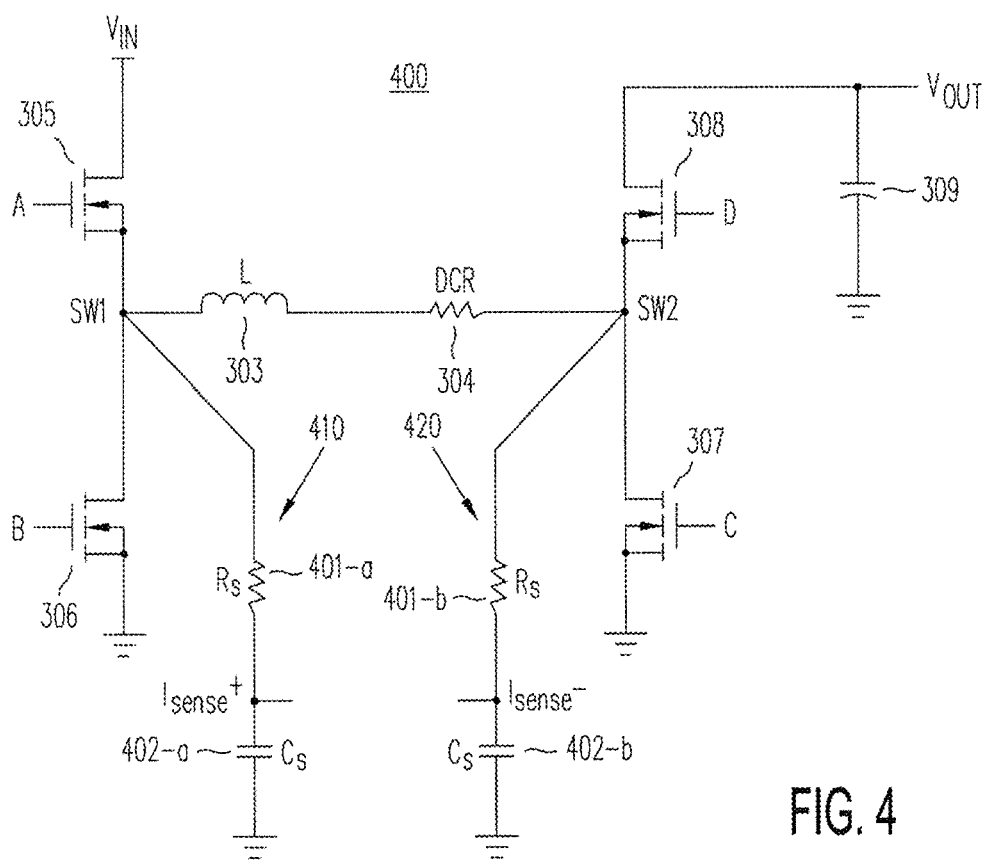
FIG. 4 shows four-switch buck boost converter 400 implementing a DCR current-sensing method in accordance with one embodiment of the present invention.

FIG. 4 shows four-switch buck boost converter 400 implementing a DCR current-sensing method in accordance with one embodiment of the present invention. In contrast with four-switch buck boost converter 300 of FIG. 3, which provides sensing resistor 301 and sensing capacitor 302 in parallel to inductor 303, four-switch buck boost converter 400 provides RC filters 410 and 420, consisting of sensing resistor 401-a and sensing capacitor 402-a and sensing resistor 401-b and sensing capacitor 402-b, respectively. The sensed voltage across nodes $I_{sense+}$ and $I_{sense-}$ in RC filters 410 and 420, respectively, represent the differential voltage across switching nodes SW1 and SW2. By matching the time constant $L/R_{DCR}$ to the time constant $R_sC_s$ in each of RC filters 410 and 420, the sensed voltage $V_{sense}$ is directly proportional to the inductor current $i_L$ and DC resistance $R_{DCR}$ of inductor 303 and $V_{sense}=I_{sense+}-I_{sense-}=i_L*R_{DCR}$ (see FIG. 4).

In the embodiment of FIG. 4, lossless full-inductor current-sensing is achieved without high common-mode noise. However, sensing capacitors 402-a and 402-b should be kept very well-matched, so as to eliminate any transient differential error. Such matching may be achieved, for example, by fabricating both sensing capacitors on the same silicon substrate. Also, the DC bias voltages at sensing capacitors 402-a and 402-b vary according to the input and output voltages. Preferably, sensing capacitors 402-a and 402-b should be implemented by capacitors with low voltage coefficients, so as to maintain the matched time constants over wide voltage range.

Figure 5:
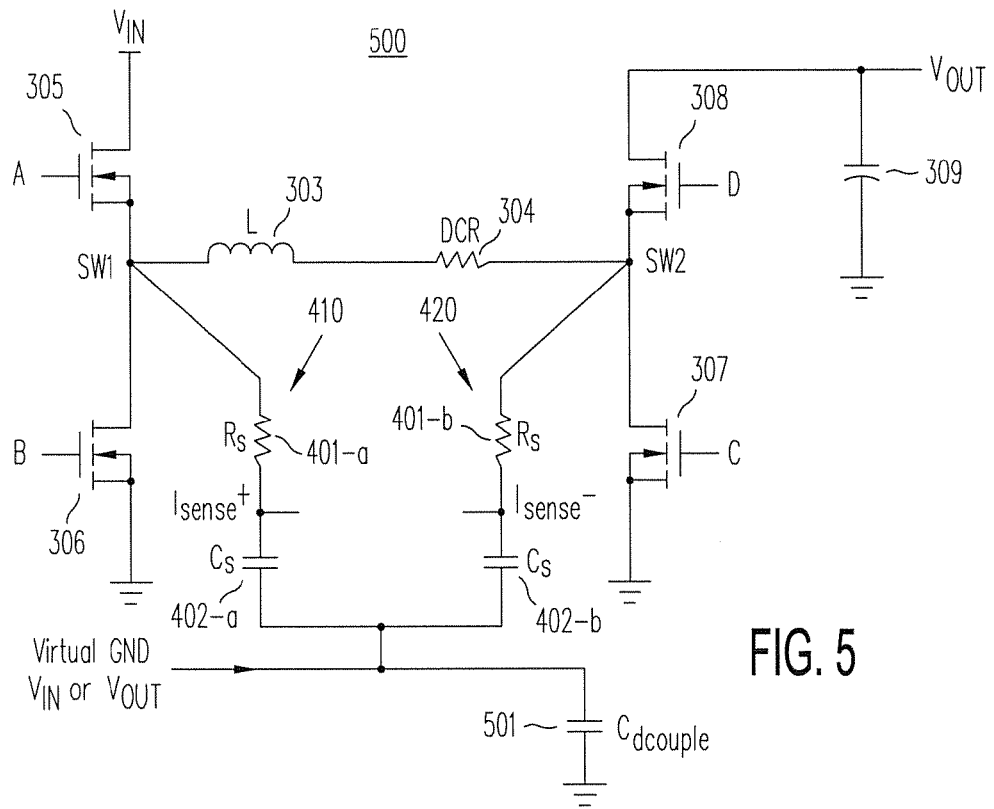
FIG. 5 shows four-switch buck boost converter 500 which eliminates DC bias voltages at sensing capacitors 402-a and 402-b by referring RC filters 410 and 420 to a virtual ground, in accordance with one embodiment of the present invention.

FIG. 5 shows four-switch buck boost converter 500 which eliminates DC bias voltages at sensing capacitors 402-a and 402-b by referring RC filters 410 and 420 to a virtual ground, in accordance with one embodiment of the present invention. As shown in FIG. 5, rather than connecting sensing capacitors 402-a and 402-b to system ground, sensing capacitors 402-a and 402-b are coupled to a virtual ground, which may be a different reference voltage, depending on the operation mode. For example, in the buck mode (i.e., the operating mode in which switch 308 is always conducting), the virtual ground may be coupled to output voltage $V_{OUT}$. In the boost mode (i.e., in the operating mode in which switch 305 is always conducting), the virtual ground may be coupled to input voltage $V_{IN}$. In the buck-boost mode, the virtual ground may be controlled to track the average voltage of nodes SW1 and SW2. Decoupling capacitor 501 maintains the voltage at the virtual ground during any mode switching, and transient voltage excursions. In four-switch buck boost converter 500 of FIG. 5, the resistors 401-a and 401-b and sensing capacitors 402-a and 402-b are also designed to match the time constant of inductor current $i_L$ (i.e., $L/R_{DCR}=R_sC_s$; see FIG. 5). The virtual ground is preferably well-maintained during buck-boost mode, so as to avoid any error due to mismatch of sensing capacitors 402-a and 402-b during transients. Again sensing capacitors 402-a and 402-b should be well-matched to avoid transient errors in buck-boost mode operations.

Figure 6:
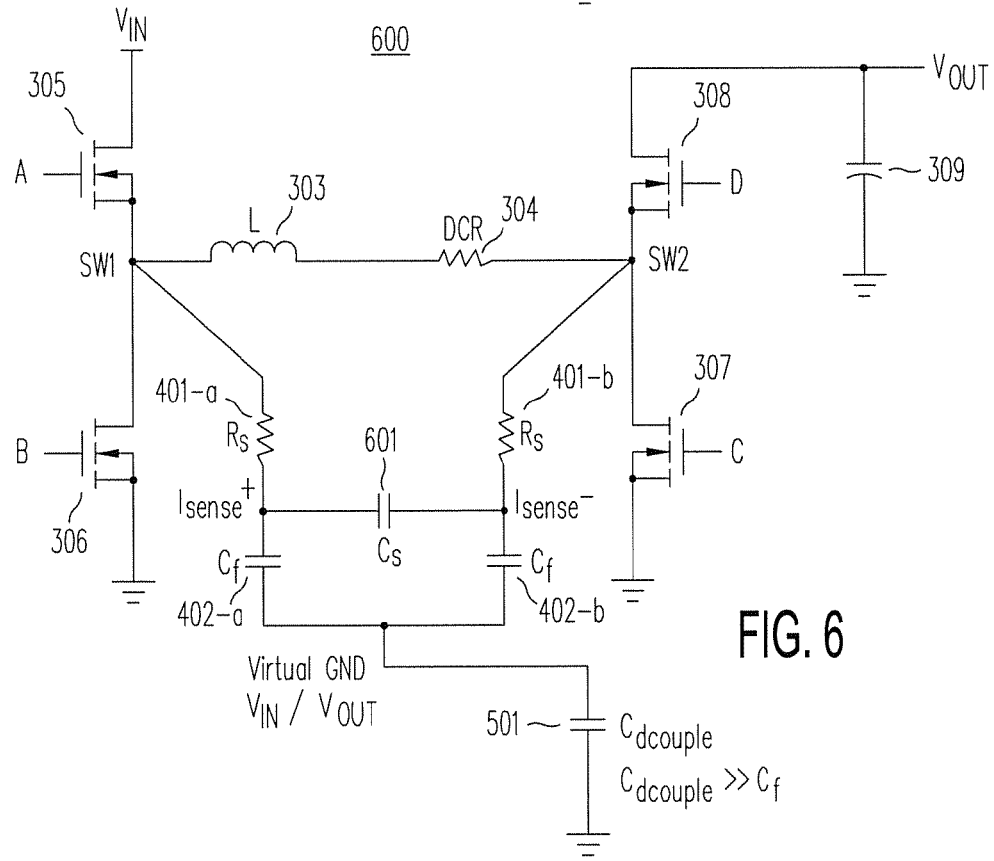
FIG. 6 shows four-switch buck boost converter 600 which provides more robust performance than four-switch buck boost converter 500 of FIG. 5 when operating in buck-boost mode, in accordance with one embodiment of the present invention.

FIG. 6 shows four-switch buck boost converter 600 which provides more robust performance than four-switch buck boost converter 500 of FIG. 5 when operating in buck-boost mode, in accordance with one embodiment of the present invention. Four-switch buck boost converter 600 improves transient performance by including sensing capacitor 601 (with a capacitance $C_s$) in addition to sensing capacitors 402-a and 402-b, which are each now provided a capacitance $C_f$. In four-switch buck boost converter 600, the time constant of inductor current $i_L$ is matched according to the equation $$\frac{L}{R_{DCR}} = 2R_S\left(C_S + \frac{C_f}{2}\right)$$

(see, FIG. 6). In this equation, the term inside the parentheses may be designed such that capacitance $C_s$ of capacitor 601 is dominant (i.e., capacitance $C_f$ is selected to be much less than capacitance $C_s$), so as to allow capacitance $C_s$ to match the time constant in the inductor current. Because this approach reduces the sensitivity to sensing capacitors 402-a and 402-b, any effect arising from a mismatch in capacitance between capacitors 402-a and 402-b is significantly minimized.

A simulation was performed to investigate the modified DCR current-sensing method in four-switch buck boost converter 600 of FIG. 6. In this simulation, inductor 303 is provided an inductance L=4.7 uH, DC resistance $R_{DCR}$=10 mΩ, sensing resistor 401-a and 401-b are each provided resistance $R_S$=33.33 kΩ, and sensing capacitor 601 is provided a nominal capacitance $C_S$ of 0.0047 uF, capacitors 402-a and 402-b are provided capacitances of 0.0037 uF and 0.0057 uF, respectively, to simulate a 10% mismatch of nominal capacitance $C_f$ between capacitors 402-a and 402-b. In this simulation, four-switch buck-boost converter 600 is operated in buck-boost mode. The input voltage is initially ramped up from 0 volts to 10 volts over 0.1 ms, is then maintained at 10 volts for 0.4 ms, and then allowed to rise to 13 volts over 0.15 ms, where it is held until 2.0 ms. During that period, the output voltage is initially at zero, but rises to about 15 volts by 0.7 ms, and is regulated at that level until 1.3 ms, when it is abruptly grounded. The difference between the current in inductor 303 and the measured current based on the voltage drop across capacitor 601 is found to be insignificant throughout the simulation period. The 10% mismatch in capacitors 402-a and 402-b is estimated to cause a transient voltage of less than 4 mV across sense capacitor 601.

Figure 7:
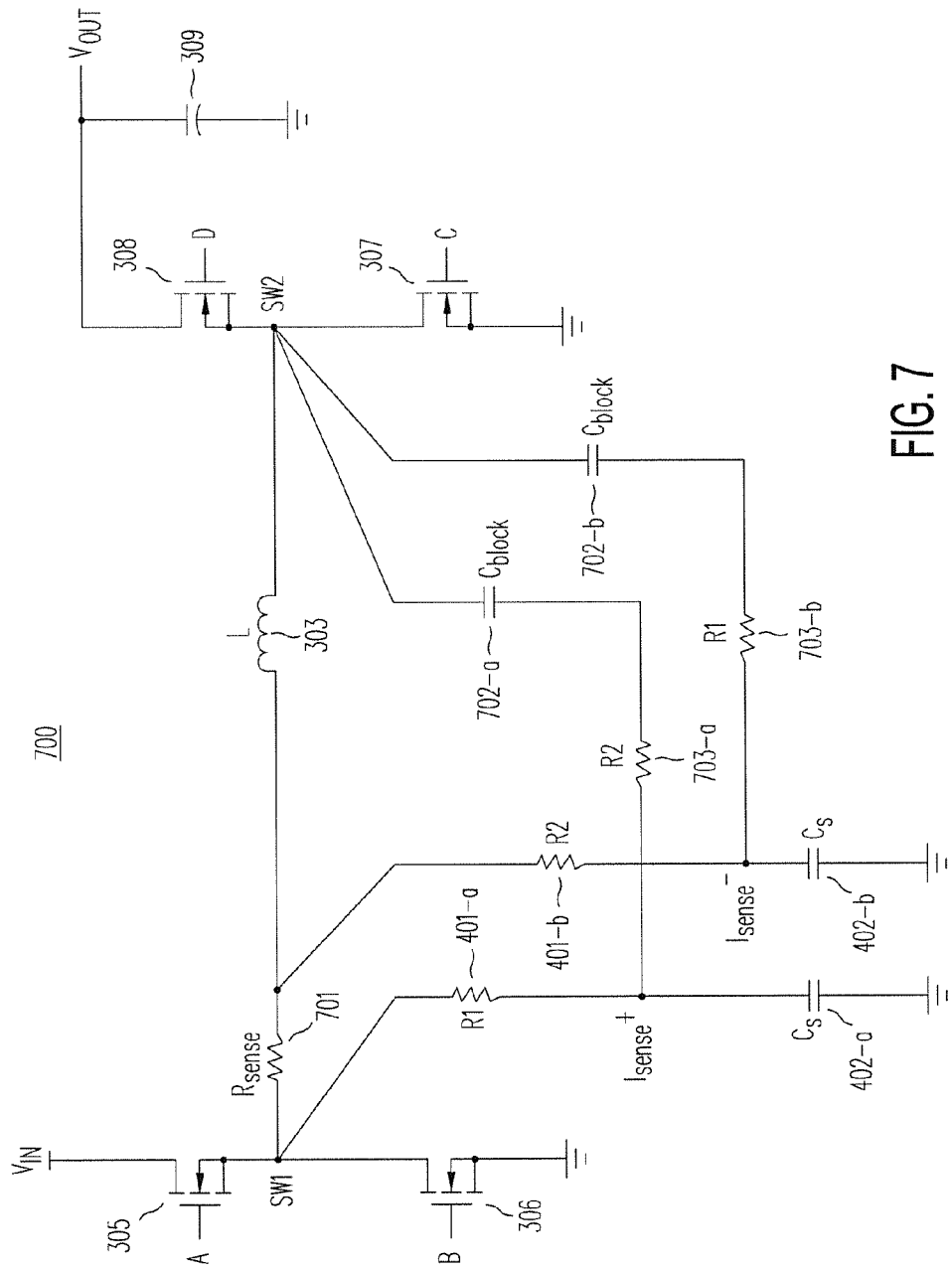
FIG. 7 shows four-switch buck-boost converter 700 using sensing resistor 701, rather than the DC resistance of inductor 303, to sense the current in inductor 303, in accordance with one embodiment of the present invention.

For high precision operations, a sensing resistor may be provided in place of DCR 304 (i.e., the DC resistance of inductor 303), as the DC resistance of an inductor is less reliable. FIG. 7 shows four-switch buck-boost converter 700 using sensing resistor 701 to sense the current in inductor 303, in accordance with one embodiment of the present invention. As shown in FIG. 7, sensing resistor 701, with a resistance $R_{sense}$, is connected in series with inductor 303 (resistor 701 may be connected to either node SW1 or node SW2, i.e., on either side of inductor 303). The terminals of sensing resistor 701 are each respectively coupled to ground through serially connected RC circuits formed by sensing resistors 401-a and 401-b and sensing capacitors 402-a and 402-b. In addition, resistors 703-a and 703-b and blocking capacitors 702-a and 702-b form two RC circuits that respectively connect nodes $I_{sense+}$ and $I_{sense-}$ to node SW2 at the terminal of inductor 303 away from sensing resistor 701. Blocking capacitors 702-a and 702-b are each selected to have a capacitance $C_{block}$ that is much less than the capacitance $C_S$ in each of sensing capacitor 402-a and 402-b. As shown in FIG. 7, resistors 401-a and 703-b both have a resistance $R_1$ and resistors 401-b and 703-a both have a resistance $R_2$. In this configuration, capacitance $C_S$ and resistor values $R_1$ and $R_2$ may be selected such that the RC time constant of resistor 401-b and sensing capacitor 402-b can be matched to the inductor 303

$$\left(\text{i.e., } \frac{L}{DCR} = R_2 C_S\right),$$

while the resistance relationship $$\frac{R_2}{R_1} - 1 = \frac{R_{sense}}{DCR}$$

holds (see, FIG. 7). The voltage drop $V_{sense}$ across nodes $I_{sense+}$ and $I_{sense-}$ is given by the product of inductor current $i_L$ and sensing resistance $R_{sense}$.

Figure 8:
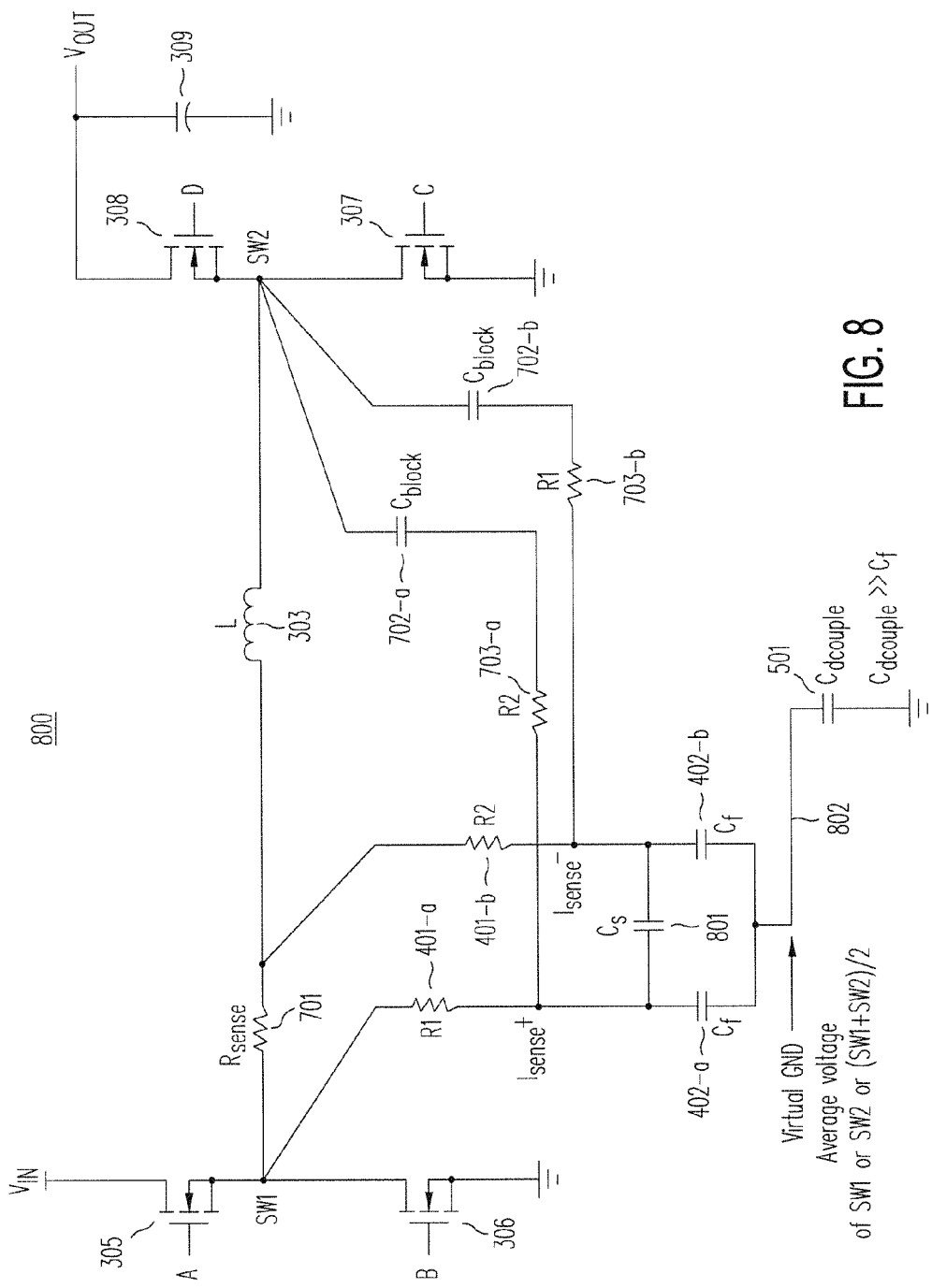
FIG. 8 shows four-switch buck-boost converter 800, which provides sensing capacitor 801 across nodes $I_{sense+}$ and $I_{sense-}$ and a virtual ground node 802, according to one embodiment of the present invention.

The virtual ground technique and the technique of providing a sensing capacitor across $I_{sense+}$ and $I_{sense-}$ to avoid the effects of a capacitance mismatch in capacitors 402-a and 402-b, as discussed above with respect to FIGS. 5 and 6, may also be applicable to four-switch buck-boost converter 700 of FIG. 7. FIG. 8 shows four-switch buck-boost converter 800, which provides sensing capacitor 801 across nodes $I_{sense+}$ and $I_{sense-}$ and virtual ground node 802, according to one embodiment of the present invention. As shown in FIG. 8, decoupling capacitor (with capacitance $C_{dcouple}$) isolates virtual ground node 802 from the true ground reference. The voltage at virtual ground node 802 may be controlled to be equal to the average voltage at node SW1, node SW2, or their average $$\frac{(V_{SW1} + V_{SW2})}{2}.$$

In this configuration of four-switch buck-boost converter 800 of FIG. 8, by choosing sensing capacitance $C_S$ to be greater than capacitance $C_f$ in each of capacitors 402-a and 402-b and much less than capacitance $C_{block}$, the time constant of inductor 303 is matched according to the equation $$\frac{L}{DCR} = R_2\left(C_S + \frac{C_f}{2}\right),$$

while the resistance relationship $$\frac{R_2}{R_1} - 1 = \frac{R_{sense}}{DCR}$$

holds. The voltage drop $V_{sense}$ across nodes $I_{sense+}$ and $I_{sense-}$ is given by the product of inductor current $i_L$ and sensing resistance $R_{sense}$ (see, FIG. 8). Of course, as in four-switch buck-boost converter 700 of FIG. 7, resistor 701 may be connected to either node SW1 or node SW2, i.e., on either side of inductor 303.

The present invention is applicable to any application that requires inductor current-sensing, such as sensing an average inductor current. The methods illustrated in FIGS. 4-6 may be used to modify an inductor current through highpass or low-pass filtering, thus providing a lossless method to sense a continuous inductor current without incurring a DC error. Methods of the present invention are suitable for use in both voltage-mode or current-mode control of a four-switch buck boost converter. The present invention may be implemented in an integrated circuit.

The above-detailed description is provided to illustrate the specific embodiments of the present invention and is not intended to be limiting. Various modifications and variations within the scope of the present invention are possible. The present invention is set forth in the following claims.

We claim:

1. An inductor current-sensing circuit for measuring a current in a primary inductor of a four-switch buck boost converter with an inductance and an equivalent DC resistance, the four-switch buck boost converter receiving an input voltage and providing an output voltage, the inductor current-sensing circuit comprising:
   a first RC network coupled between a first terminal of the primary inductor and a virtual ground reference;
   a second RC network coupled between a second terminal of the primary inductor and the virtual ground reference, wherein the first RC network and the second RC network each have a time constant substantially equal to the ratio between the inductance and the DC resistance; and
   a decoupling capacitor connecting the virtual ground reference to a system ground reference.

2. The inductor current-sensing circuit of claim 1, further comprising a sensing capacitor connected between the first RC network and the second RC network.

3. The inductor current-sensing circuit of claim 2, wherein the sensing capacitor has a greater capacitance than an effective capacitance of each of the first and the second RC networks.

4. An inductor current-sensing circuit for measuring a current in a primary inductor of a four-switch buck boost converter with an inductance and an equivalent DC resistance, the four-switch buck boost converter receiving an input voltage and providing an output voltage, the inductor current-sensing circuit comprising:
   a first RC network coupled between a first terminal of the primary inductor and a virtual ground reference; and
   a second RC network coupled between a second terminal of the primary inductor and the virtual ground reference, wherein the first RC network and the second RC network each have a time constant substantially equal to the ratio between the inductance and the DC resistance, and wherein the virtual ground reference refers to the output voltage when the four-switch buck boost converter operates in a buck mode.

5. The inductor current-sensing circuit of claim 4, further comprising a sensing capacitor connected between the first RC network and the second RC network.

6. The inductor current-sensing circuit of claim 5, wherein the sensing capacitor has a greater capacitance than an effective capacitance of each of the first and the second RC networks.

7. An inductor current-sensing circuit for measuring a current in a primary inductor of a four-switch buck boost converter with an inductance and an equivalent DC resistance, the four-switch buck boost converter receiving an input voltage and providing an output voltage, the inductor current-sensing circuit comprising:
   a first RC network coupled between a first terminal of the primary inductor and a virtual ground reference; and
   a second RC network coupled between a second terminal of the primary inductor and the virtual ground reference, wherein the first RC network and the second RC network each have a time constant substantially equal to the ratio between the inductance and the DC resistance, and wherein the virtual ground reference refers to the input voltage when the four-switch buck boost converter operates in a boost mode.

8. The inductor current-sensing circuit of claim 7, further comprising a sensing capacitor connected between the first RC network and the second RC network.

9. The inductor current-sensing circuit of claim 8, wherein the sensing capacitor has a greater capacitance than an effective capacitance of each of the first and the second RC networks.

10. An inductor current-sensing circuit for measuring a current in a primary inductor of a four-switch buck boost converter with an inductance and an equivalent DC resistance, the four-switch buck boost converter receiving an input voltage and providing an output voltage, the inductor current-sensing circuit comprising:
    a first RC network coupled between a first terminal of the primary inductor and a virtual ground reference; and
    a second RC network coupled between a second terminal of the primary inductor and the virtual ground reference, wherein the first RC network and the second RC network each have a time constant substantially equal to the ratio between the inductance and the DC resistance, and wherein the virtual ground reference refers to an average of a voltage across the first terminal of the inductor and the second terminal of the inductor, when the four-switch buck boost converter operates in a buck-boost mode.

11. The inductor current-sensing circuit of claim 10, further comprising a sensing capacitor connected between the first RC network and the second RC network.

12. The inductor current-sensing circuit of claim 11, wherein the sensing capacitor has a greater capacitance than an effective capacitance of each of the first and the second RC networks.

13. A method for measuring a current in a primary inductor of a four-switch buck boost converter with an inductance and an equivalent DC resistance, the four-switch buck boost converter receiving an input voltage and providing an output voltage, the method comprising:
    connecting a first RC network between a first terminal of the primary inductor and a virtual ground reference;
    connecting a second RC network coupled between a second terminal of the primary inductor and the virtual ground reference;
    connecting a decoupling capacitor between the virtual ground reference and a system ground reference; and
    measuring a voltage between a node in the first RC network and a node in the second RC network, wherein the first RC network and the second RC network each have a time constant substantially equal to the ratio between the inductance and the DC resistance.

14. The method of claim 13, wherein the node in the first RC network and the node in the second RC network each correspond to a terminal of a sensing capacitor in each RC network.

15. The method of claim 13, further comprising connecting a sensing capacitor between the first RC network and the second RC network.

16. The method of claim 15, wherein the sensing capacitor has a greater capacitance than an effective capacitance of each of the first and the second RC networks.

17. A method for measuring a current in a primary inductor of a four-switch buck boost converter with an inductance and an equivalent DC resistance, the four-switch buck boost converter receiving an input voltage and providing an output voltage, the method comprising:

connecting a first RC network between a first terminal of the primary inductor and a virtual ground reference;

connecting a second RC network coupled between a second terminal of the primary inductor and the virtual ground reference; and measuring a voltage between a node in the first RC network and a node in the second RC network, wherein the first RC network and the second RC network each have a time constant substantially equal to the ratio between the inductance and the DC resistance and wherein the virtual ground reference refers to the output voltage when the four-switch buck boost converter operates in a buck mode.

18. The method of claim 17, wherein the node in the first RC network and the node in the second RC network each correspond to a terminal of a sensing capacitor in each RC network.

19. The method of claim 17, further comprising connecting a sensing capacitor between the first RC network and the second RC network.

20. The method of claim 19, wherein the sensing capacitor has a greater capacitance than an effective capacitance of each of the first and the second RC networks.

21. A method for measuring a current in a primary inductor of a four-switch buck boost converter with an inductance and an equivalent DC resistance, the four-switch buck boost converter receiving an input voltage and providing an output voltage, the method comprising:

connecting a first RC network between a first terminal of the primary inductor and a virtual ground reference;

connecting a second RC network coupled between a second terminal of the primary inductor and the virtual ground reference; and measuring a voltage between a node in the first RC network and a node in the second RC network, wherein the first RC network and the second RC network each have a time constant substantially equal to the ratio between the inductance and the DC resistance and wherein the virtual ground reference refers to the input voltage when the four-switch buck boost converter operates in a boost mode.

22. The method of claim 21, wherein the node in the first RC network and the node in the second RC network each correspond to a terminal of a sensing capacitor in each RC network.

23. The method of claim 21, further comprising connecting a sensing capacitor between the first RC network and the second RC network.

24. The method of claim 23, wherein the sensing capacitor has a greater capacitance than an effective capacitance of each of the first and the second RC networks.

25. A method for measuring a current in a primary inductor of a four-switch buck boost converter with an inductance and an equivalent DC resistance, the four-switch buck boost converter receiving an input voltage and providing an output voltage, the method comprising:

connecting a first RC network between a first terminal of the primary inductor and a virtual ground reference;

connecting a second RC network coupled between a second terminal of the primary inductor and the virtual ground reference; and measuring a voltage between a node in the first RC network and a node in the second RC network, wherein the first RC network and the second RC network each have a time constant substantially equal to the ratio between the inductance and the DC resistance and wherein the virtual ground reference refers to an average of a voltage across the first terminal of the inductor and the second terminal of the inductor, when the four-switch buck boost converter operates in a buck-boost mode.

26. The method of claim 25, wherein the node in the first RC network and the node in the second RC network each correspond to a terminal of a sensing capacitor in each RC network.

27. The method of claim 25, further comprising connecting a sensing capacitor between the first RC network and the second RC network.

28. The method of claim 27, wherein the sensing capacitor has a greater capacitance than an effective capacitance of each of the first and the second RC networks.

* * * * *